United States Patent [19]

Bertrand et al.

[11] Patent Number: 4,525,533

[45] Date of Patent: Jun. 25, 1985

[54] POLYMER COMPOSITIONS

[75] Inventors: Jean-Noel Bertrand, Wezembeek Oppem; Jean Castelein, Mellery, both of Belgium

[73] Assignee: Montefina, S.A., Belgium

[21] Appl. No.: 593,230

[22] Filed: Mar. 27, 1984

[30] Foreign Application Priority Data

Mar. 29, 1983 [LU] Luxembourg ............................ 84720

[51] Int. Cl.$^3$ .............................................. C08L 53/02
[52] U.S. Cl. ......................................... 525/98; 525/95
[58] Field of Search ..................................... 525/98, 95

[56] References Cited

U.S. PATENT DOCUMENTS

| 3,281,383 | 10/1966 | Zelinski et al. | 525/122 |
| 4,073,831 | 2/1978 | Tabana et al. | 525/98 |
| 4,386,125 | 5/1983 | Shiraki et al. | 525/98 |
| 4,386,187 | 5/1983 | Grancio et al. | 525/98 |

FOREIGN PATENT DOCUMENTS 48-28553  4/1973  Japan .................................... 525/98

Primary Examiner—Allan M. Lieberman
Attorney, Agent, or Firm—John K. Abokhair

[57] ABSTRACT

A polymer composition is disclosed which comprises polystyrene, polypropylene and a sequenced copolymer of conjugated diene and vinylaromatic compound such as styrene which has a radial structure. The polymer composition has improved migration properties.

7 Claims, No Drawings

POLYMER COMPOSITIONS

The present invention relates to a polymer composition having improved properties for use as packaging material, and particularly as packaging material for food products. More particularly, the present invention relates to polymer compositions comprising polypropylene, polystyrene and a sequenced copolymer, said compositions having greatly improved migration properties.

In the field of packaging of food products, and particularly the packaging of margarine, milky products, pastries or cookies, searchers have spent a long time before obtaining compositions having the excellent working properties of polystyrene, combined to the remarkable properties of polypropylene, particularly its low permeability to water vapor. Indeed, at 100 μm thickness, polypropylene has a water vapor permeability of 0.5 grams per square meter.

However, one of the first drawbacks met was the uncompatibility of the two polymers which leads to a strict separation of phases, resulting in a final composition which is industrially unusable.

It has been proposed to use compositions comprising polystyrene, polypropylene and an essentially linear sequenced copolymer.

These compositions present the advantage of being perfectly homogeneous; moreover, they combine the thermoplasticity properties of polystyrene to the barrier properties of polypropylene. However, it has been noticed that with these compositions, the migrations of matter are largely out of the acceptable ranges required in the food packaging industries.

Therefore there exists a need for polymer compositions used in the packaging field, particularly in the packaging of food products, which not only possess the easiness of working, according to the known techniques, such as extrusion, injection thermoforming, and a low permeability to water vapor, but which have in addition greatly improved migration properties.

SUMMARY OF THE INVENTION

It is therefore an object of the present invention to provide polymer compositions which fulfill the conditions set forth hereabove.

It is also an object of the present invention to provide polymer compositions comprising polystyrene, polypropylene and a sequenced copolymer, which possess greatly improved migration properties.

In accomplishing the foregoing objects, there has been provided in accordance with the present invention a polymer composition comprising polystyrene, polypropylene and a sequenced copolymer wherein the sequenced copolymer is a radial type copolymer of a conjugated diene and a styrene.

DETAILED DESCRIPTION OF THE PREFERRED EMBODIMENTS

Suitable polypropylenes used in the polymer composition of the invention are crystalline polypropylenes which may contain nucleation agents, and which are obtained in the presence of a stereospecific catalyst. Said crystalline polypropylenes have an isotacticity index of at least 80 (determined as the residue of the extraction with boiling heptane, and expressed in percent by weight). Suitable nucleation agents include talc or an adipic acid-zeolith mixture, and other analogs.

The polystyrene used in the composition of the invention may be crystal poplystyrene, but high impact polystyrene is preferably used, this latter containing at least 3% by weight of a rubber such as polybutadiene or other analogs.

The Applicant has now unexpectedly found that a significant reduction of migration of matters through the packaging material is otained when the packaging composition comprises in addition to polystyrene and polypropylene, a sequenced copolymer of conjugated diene and styrene having a radial structure. It has even been noticed that in some cases, the migration may be three times less than in usual compositions which do not contain a sequenced copolymer having a radial structure.

The sequenced copolymer having a radial structure is generally prepared from a conjugated diene, such as butadiene or isoprene, and from a vinylaromatic compound, particularly styrene. Said copolymer may be represented as constituted of at least three branches of sequenced copolymer, each branch comprising a segment of diene polymer with at the end, a segment constituted of styrene. The other end is bound to two or three similar branches. Such a sequenced copolymer may be prepared in accordance with the process disclosed in the U.S. Pat. No. 3,281,383 which is hereby incorporated by reference in its entirety.

These sequences copolymers having a radial structure contain amounts of conjugated dienes, such as butadiene, isoprene or 2,3-dimethyl-1,3-butadiene or mixtures thereof, and amounts of styrene which may vary widely. Generally, radial copolymers comprise from about 50% to about 70% by weight of a conjugated diene and from about 50% to about 30% by weight of styrene. Particularly interesting results may be obtained with sequenced copolymers having a radial structure and which comprise from about 60 to 70% by weight of butadiene and from about 40 to 30% by weight of styrene.

The sequenced copolymers used in the compositions of the invention generally have a molecular weight of from about 100,000 to about 300,000.

Sequenced copolymers, the molecular weight of which is higher than 300,000 are too difficult to blend. This higher limit particularly depends on the blending capacity of the used apparatus.

Generally the composition of the present invention comprises from about 30 to about 64% by weight of polypropylene, from about 30 to about 50% by weight of polystyrene and from about 6 to about 30% by weight of sequenced copolymer having a radial structure. Preferably, the composition of the invention comprises from about 50 to about 40% by weight of polypropylene, from about 40 to about 50% by weight of polystyrene and from about 8 to about 15% by weight of sequenced copolymer having a radial structure.

It has also been noted that the physical properties of the compositions of the invention are improved, particularly the hardness, the tensile strength together with the flexural strength.

The migration properties of a composition which has to be used as packaging material for food products are very important. Indeed the components of the packaging material cannot migrate within the packed product, rendering it unusable for consumption.

In order to determine the migration properties of a polymer composition, a sample of the composition to be tested in taken out and is immersed in olive oil for 10 days at a temperature of 40° C. The sample is weighted before and after immersion. Weight variation is due to oil retention by the polymeric material and migration of the components from the packaging material. The sample is thereafter dried and olive oil is extracted with fluoro-hydrocarbons for 24 to 48 hours in order to remove the olive oil which has penetrated into the sample. After treatment, the amount of oil is determined by chromatography in the presence of methyl margarinate as standard. If at the start, one has determined a gain in weight of p grams and by analysis, one determines a penetration of p' grams of oil, the migration of components from the packaging material into the olive oil is expressed by the difference p'−p.

The following examples are given in order to better illustrate the invention but without limiting it.

EXAMPLE 1

A composition was prepared by blending 45 parts by weight of isotactic polypropylene, having a melt index of 12 g/10 min., with 45 parts by weight of a high impact polystyrene having a melt index of 2.7 g/10 min. and a rubber content of 9%, with 10 parts by weight of a sequenced copolymer having a radial structure which comprised butadiene and styrene. This sequenced copolymer having a radial structure comprised 70% by weight butadiene and 30% by weight styrene. Its molecular weight was of 150,000.

The different components of the blend were introduced into the feed hopper of a one screw extruder (diameter 60 cm and L/D ratio of 32 and containing a Maddoc element). From the extruded blend, pellets were prepared.

Thereafter a cup was molded by thermoforming, as a representative sample of the blend. This cup had a thickness of 0.35 mm and was used to determine the different mechanical and physical properties of the composition.

A penetration of olive oil into this blend of 157.6 mg/dm$^2$ and a total migration of 16.7 mg/dm$^2$ were determined.

The other properties of the blend are indicated in the following Table 1.

By way of comparison, a similar blend was prepared which comprised 45 parts by weight of the same polypropylene, 45 parts by weight of the same high impact polystyrene and 10 parts by weight of an essentially linear sequenced copolymer of the S-B-S type. Said sequenced copolymer comprised 72% by weight of butadiene and 28% by weight of styrene. Its molecular weight was 75,000.

The blend was extruded and a cup was molded under the same conditions as hereabove stated. A penetration of olive oil of 303.9 mg/dm$^2$ and a total migration of 32.5 mg/dm$^2$ were determined. The other properties of the blend are indicated in the following Table 1.

TABLE I

| Properties | Radial sequenced copolymer | Linear sequenced copolymer |
| --- | --- | --- |
| Melt index g/10 min. | 14.4 | 15.8 |
| Vicat (°C.) | 77 | 67 |
| Rockwell Hardness L | 41 | 27 |
| Tensile strength (N/mm$^2$) | 24 | 22 |
| Tensile modulus (KN/mm$^2$) | 1.07 | 0.81 |
| Flexural strength (N/mm$^2$) | 45.0 | 36.5 |
| Flexural modulus (KN/mm$^2$) | 1.64 | 1.35 |
| Heat deformation temperature (°C.) | 63.5 | 58.0 |

EXAMPLE 2

A composition was prepared by blending 45 parts by weight of polypropylene having a melt index of 12 g/10 min., 45 parts by weight of a high impact polystyrene having a melt index of 11 g/10 min. and a rubber content of 7%, with 10 parts by weight of a sequenced copolymer having a radial structure which comprised 70% by weight butadiene and 30% by weight styrene, with a molecular weight of 150,000.

This blend was extruded under the same procedure as described in Example 1. Sample of 4 mm thickness were injection molded. The pentration of olive oil into said composition was about 4.26 mg/dm$^2$ and the total migration was about 0.45 mg/dm$^2$. The other properties are indicated in the following Table II.

By way of comparison, a similar blend was prepared with 45 parts by weight each of the same polystyrene and polypropylene and 10 parts by weight of an essentially linear sequenced copolymer of the S-B-S type (Cariflex TR 1102). The blend was extruded and samples were molded as hereabove described. The penetration of olive oil was of 17.63 mg/dm$^2$. The other properties are indicated in the following Table II.

TABLE II

| Properties | Radial sequenced copolymer with HIPS at 7% rubber | Radial sequenced copolymer with HIPS at 9% rubber | Linear sequenced copolymer with HIPS at 7% rubber | Linear sequenced copolymer with HIPS at 9% rubber |
| --- | --- | --- | --- | --- |
| Melt index (g/10 min) | 20.8 | 14.4 | 20.0 | 15.8 |
| Rockwell Hardness L | 20.5 | 41 | 11.5 | 27 |
| Tensile strength (N/mm$^2$) | 19.8 | 24.2 | 19.3 | 22.2 |
| Tensile modulus (KN/mm$^2$) | 0.71 | 1.07 | 0.72 | 0.81 |
| Flexural strenght (N/mm$^2$) | 35.3 | 45.0 | 28.6 | 36.5 |
| Flexural modulus (KN/mm$^2$) | 1.36 | 1.64 | 1.06 | 1.35 |
| Penetration (mg/dm$^2$) | 4.26 | 2.51 | 15.96 | 17.63 |
| Migration (mg/dm$^2$) | 0.45 | 0.2 | 1.7 | 1.9 |

EXAMPLE 3

Numerous compositions were prepared which contained high impact polystyrene, polypropylene and various sequenced copolymers having a radial structure.

Moreover, by way of comparison, similar compositions were prepared but which contained essentially linear sequenced copolymers.

The high impact polystryene used had a rubber content of 9% by weight and a melt index of 2.7 g/10 min.

The sequenced copolymers used have been designated by the references A, B, C and D. Copolymer A comprised 70% by weight butadiene and 30% by weight styrene, with a molecular weight of 280,000.

Copolymer B comprised 60% by weight butadiene and 40% by weight styrene, with a molecular weight of 180,000. Copolymer C comprised 70% by weight butadiene and 30% by weight styrene, with a molecular weight of 150,000. Copolymer D comprised 60% butadiene and 40% by weight styrene, with a molecular weight of 230,000. It should be noted that copolymer D contained 100% by weight of mineral oil based on the copolymer weight.

The linear sequenced copolymer was of the S-B-S type and comprised 72% by weight butadiene and 28% by weight styrene with a molecular weight of 75,000.

The different polypropylenes used had the following properties:

Polypropylene A: melt index 0.7 g/10 min.
Polypropylene B: melt index 3.0 g/10 min.
Polypropylene C: is a nucleated polypropylene having a melt index of 3.0 g/10 min.
Polypropylene D: melt index 12 g/10 min.
Polypropylene E: melt index 23 g/10 min.

The results of the experiments are indicated in the following Table III.

TABLE III

| Composition | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| High impact polystyrene | | 45 | 46 | 50 | 30 | 45 | 46 | 50 | 30 | 45 | 45 | 45 | 45 | 45 | 45 | 45 |
| Polypropylene | A | | | | | | | | | | | | | 45 | | |
| | B | | | | | | | | | | | 45 | | | | |
| | C | | | | | | | | | | | | 45 | | | |
| | D | 45 | 46 | 35 | 50 | 45 | 46 | 35 | 50 | 45 | 45 | | | | | 45 |
| | E | | | | | | | | | | | | | | 45 | |
| Sequenced copolymer with radial structure | A | | | | | | | | | | | | | | | 10 |
| | B | | | | | | | | | 10 | | | | | | |
| | C | 10 | 8 | 15 | 20 | | | | | | | 10 | 10 | 10 | 10 | |
| | D | | | | | | | | | | 10 | | | | | |
| Linear sequenced copolymer | | | | | | 10 | 8 | 15 | 20 | | | | | | | |
| Antioxidant | | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| Properties | | | | | | | | | | | | | | | | |
| Melt index | | 13.5 | 15.1 | 9.1 | 10.8 | 15.4 | 15.8 | 13.6 | 17.1 | 17.1 | 23.6 | 3.5 | 4.0 | 1.2 | 21.3 | 14.7 |
| Vicat (°C.) | | 80.8 | 77.9 | 74.9 | 69.8 | 67.3 | 72.0 | 67.2 | 60.4 | 79.2 | 80.2 | 81.2 | 81.9 | 81.7 | 78.5 | 85.7 |
| Heat deformation temperature (°C.) | | 66.3 | 64.5 | 65.6 | 54.1 | 55.7 | 59.2 | 55.7 | 46.1 | 57.6 | 58.3 | 58.5 | 59.8 | 61.3 | 62.3 | 62.3 |
| Tensile strength (N/mm$^2$) | | 24.7 | 25.2 | 22.0 | 20.0 | 23.0 | 24.0 | 21.2 | 19.0 | 22.9 | 23.0 | 24.6 | 25.1 | 24.5 | 23.5 | 24.1 |
| Tensile modulus (N/mm$^2$) | | 1.24 | 1.26 | 1.16 | 0.97 | 1.04 | 1.06 | 0.85 | 0.83 | 1.05 | 1.18 | 1.28 | 1.20 | 1.15 | 1.27 | 1.25 |
| Flexural strength (N/mm$^2$) | | 42.9 | 43.8 | 40.7 | 34.0 | 38.3 | 41.3 | 35.9 | 28.6 | 41.0 | 41.3 | 46.2 | 47.4 | 46.5 | 43.2 | 45.3 |
| Flexural modulus (KN/mm$^2$) | | 1.25 | 1.36 | 1.29 | 1.07 | 1.15 | 1.26 | 1.10 | 0.87 | 1.23 | 1.25 | 1.36 | 1.39 | 1.34 | 1.34 | 1.38 |
| Migration (mgr/dm$^2$) | | 16.7 | 13.4 | 30.7 | 25.1 | 32.5 | 26.1 | 90.1 | 46.9 | 17.4 | 17.0 | 17.9 | 18.8 | 16.9 | 20.0 | 14.8 |

What we claim is:

1. A polymer composition comprising from about 30% to about 50% by weight of polystyrene, from about 30% to about 64% by weight of polypropylene and from about 6% to about 30% by weight of a sequenced radial type copolymer having a molecular weight not lower than about 100,000 wherein said radial type copolymer comprises from about 50% to about 70% by weight of conjugated diene and from about 30% to about 50% by weight of styrene.

2. The polymer composition according to claim 1 which comprises from about 8 to about 15% by weight of the sequenced copolymer, from about 40% to about 50% by weight of polypropylene and from about 40% to about 50% by weight of polystyrene.

3. The polymer composition according to claim 1 wherein the conjugated diene present in the sequenced copolymer is selected from the group which consists of butadiene, isoprene, 2,3-dimethyl-1,3-butadiene or mixtures thereof.

4. The polymer composition according to claim 1 wherein the sequenced copolymer comprises from bout 60 to about 70% by weight of conjugated diene and from about 40 to about 30% by weight of styrene.

5. The polymer composition according to claim 1 wherein the polystyrene used is selected from the group which consists of crystal polystyrene, high impact polystyrene containing at least 3% by weight of a rubbery material, or any combination thereof.

6. The polymer composition according to claim 1 wherein the polypropylene used is a crystalline polypropylene.

7. The polymer composition according to claim 6 wherein the polypropylene used contains a nucleation agent.

* * * * *